US010618723B2

(12) United States Patent
Workman

(10) Patent No.: US 10,618,723 B2
(45) Date of Patent: Apr. 14, 2020

(54) CONTAINER ASSEMBLY FOR GROUT SPECIMENS

(71) Applicant: Deslauriers, Inc., LaGrange Park, IL (US)

(72) Inventor: Gary Workman, Las Vegas, NV (US)

(73) Assignee: Deslauriers, Inc., LaGrange Park, IL (US)

( * ) Notice: Subject to any disclaimer, the term of this patent is extended or adjusted under 35 U.S.C. 154(b) by 320 days.

(21) Appl. No.: 15/347,214

(22) Filed: Nov. 9, 2016

(65) Prior Publication Data

US 2018/0127198 A1 May 10, 2018

(51) Int. Cl.
| | | |
|---|---|---|
| *B65D 85/00* | (2006.01) | |
| *B65D 65/40* | (2006.01) | |
| *B65D 5/42* | (2006.01) | |
| *B65D 5/10* | (2006.01) | |
| *B65D 5/49* | (2006.01) | |

(52) U.S. Cl.
CPC ............ *B65D 85/70* (2013.01); *B65D 5/103* (2013.01); *B65D 5/4266* (2013.01); *B65D 5/48026* (2013.01); *B65D 65/403* (2013.01)

(58) Field of Classification Search
CPC . B65D 5/18; B65D 5/103; B65D 5/14; B65D 5/4287; B65D 5/16

USPC .......................................................... 206/321
See application file for complete search history.

(56) References Cited

U.S. PATENT DOCUMENTS

| | | | | |
|---|---|---|---|---|
| 3,749,299 A | * | 7/1973 | Ingle ..................... | B65D 5/18 229/120.34 |
| 4,511,079 A | * | 4/1985 | Lopez ................. | B65D 5/0005 206/586 |
| 5,014,854 A | * | 5/1991 | Anderson ............. | B65D 5/062 229/214 |
| 2010/0308053 A1 | * | 12/2010 | Wisecarver ............. | B65D 5/10 220/315 |
| 2017/0101211 A1 | * | 4/2017 | Lee ....................... | B65D 5/001 |

* cited by examiner

*Primary Examiner* — Anthony D Stashick
*Assistant Examiner* — Raven Collins
(74) *Attorney, Agent, or Firm* — Wood, Phillips, Katz, Clark & Mortimer

(57) ABSTRACT

A container assembly comprises a container having a peripheral side wall defining a rectangular interior space and having top flap and bottom flaps folded inwardly to selectively enclose the interior space. The bottom flaps include notched edges for interlocking to maintain corners of the peripheral side wall square. An insert is removably receivable in the rectangular interior space. The insert comprises first and second panels of sheet material selectively folded to define a plurality of rectangular mold cavities in the interior space. Distal edges of the panels are notched wherein the notched edges interlock at the corners of the peripheral side wall to maintain the mold cavities square.

19 Claims, 4 Drawing Sheets

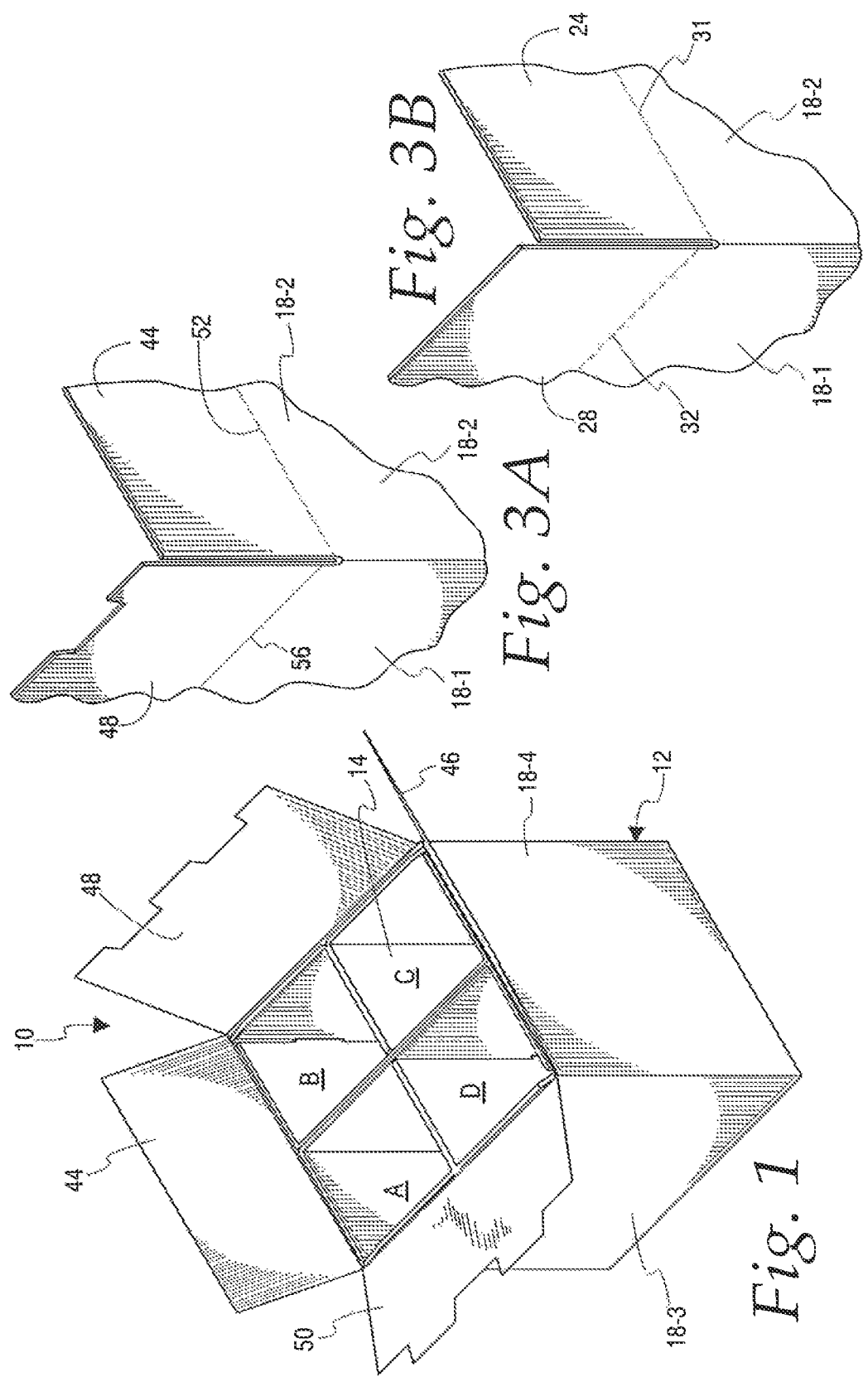

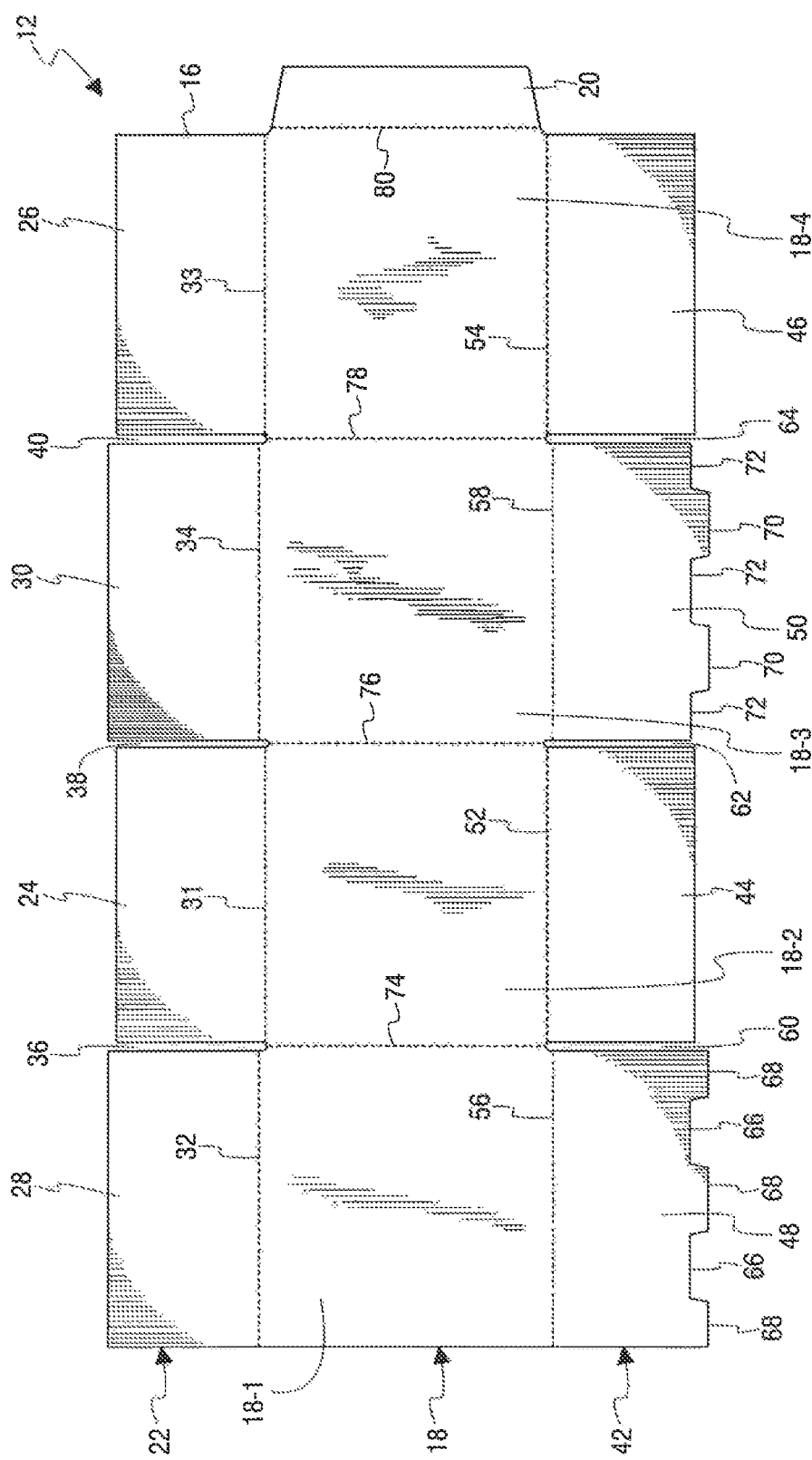

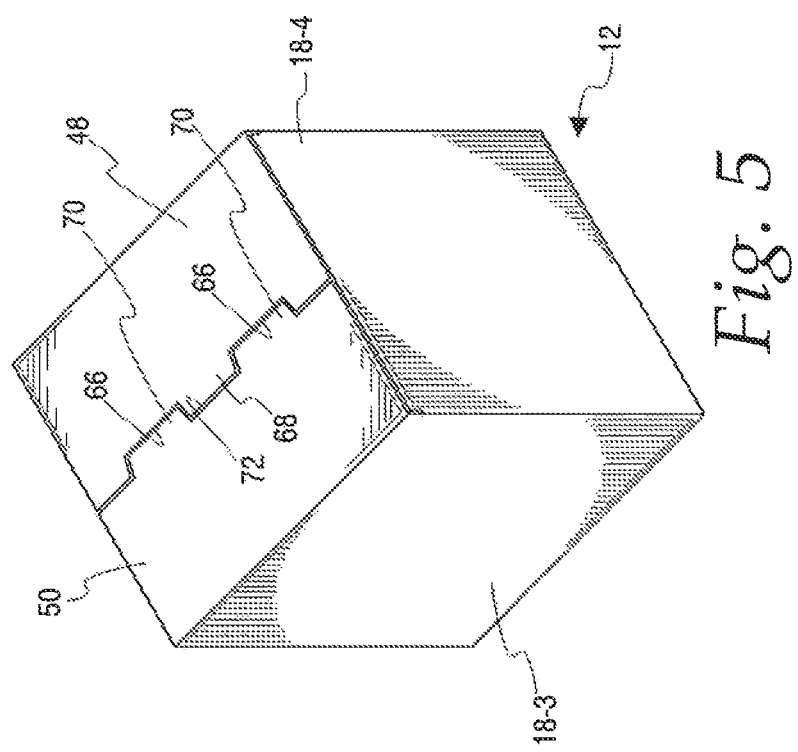
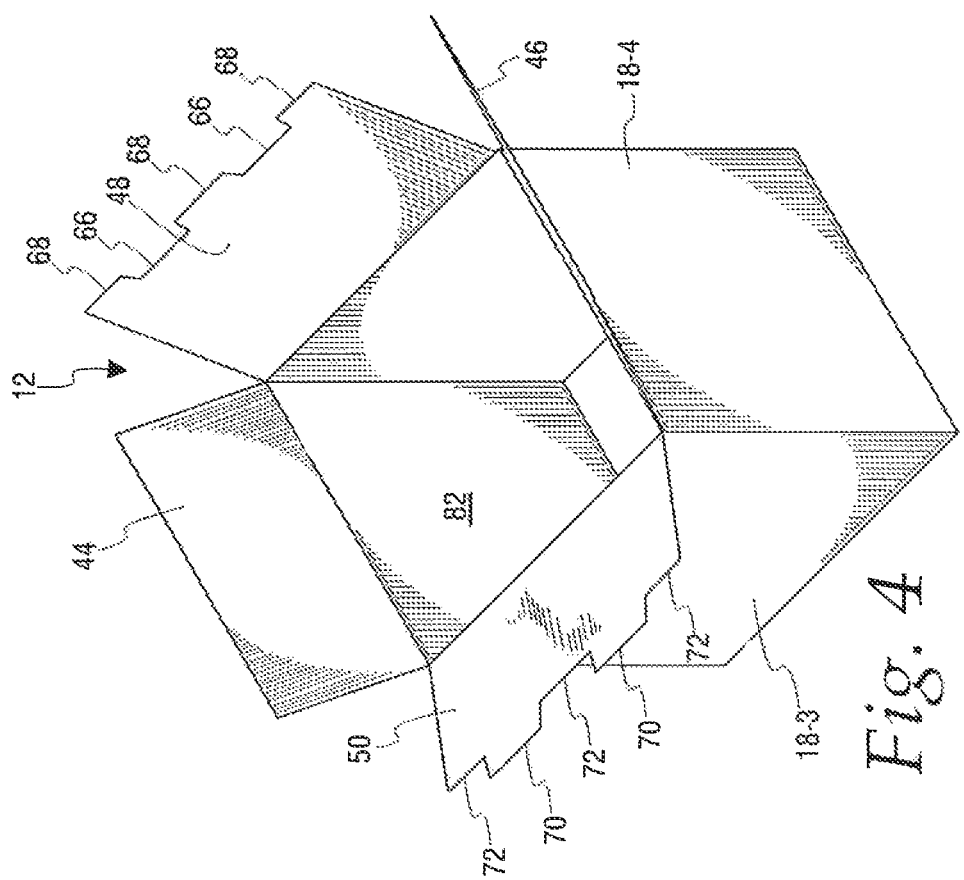
Fig. 5
Fig. 4

CONTAINER ASSEMBLY FOR GROUT SPECIMENS

CROSS-REFERENCE TO RELATED APPLICATIONS

Not Applicable.

FIELD OF THE INVENTION

This application relates to a container assembly for forming grout specimens for testing.

BACKGROUND OF THE INVENTION

Grout is a material used in reinforced masonry construction. Particularly, grout is placed in the cells of hollow concrete masonry units, sometimes referred to as cinder blocks. The grout must be fluid so that it completely fills the cells to provide a solid, grouted masonry wall. To satisfy these requirements, the grout is more fluid than concrete or mortar. This fluidity allows grout to flow through the grout space, around reinforcing bars and completely surround and bond to rebar and concrete masonry units.

Presently, grout samples are tested for compression as a verification of strength. The traditional method of forming grout samples for testing is to configure twelve concrete masonry units to form three chambers in the form of rectangular prisms. The chambers are lined with filter paper or other paper products. The chambers are filled with grout which is allowed to harden. An alternative procedure for forming grout samples is a multi-cavity container assembly such as shown in Papas U.S. Pat. No. 5,942,192, the specification of which is hereby incorporated by reference herein. This container is made of appropriate laminates such as corrugated cardboard. The container includes a divider insert that divides the container into four rectangular compartments. Each compartment is filled with grout which then hardens to form samples in the form of rectangular prisms. Particularly, each sample has generally square-shaped end walls.

As is apparent, the particular size of the overall sample is dependent on the apparatus used for forming the grout sample.

ASTM's Standard C1019-16 defines a standard test method for sampling and testing of grout. This includes the requirement that the specimens be square in cross section with a width between 3 and 3.75 inches and a height of about two times the width. The test specimen should be square on the ends, with sides planar and perpendicular to the top and bottom.

The container assembly described in the '192 patent is a regular slotted container (RSC) in which the bottom folds are taped closed to form a standard carton. Two identical inserts are folded in place into the RSC to form four cavities in which grout will be placed to form test specimens. While generally satisfactory, this design has two problems. The first arises when assembling the RSC. The folds on the bottom of the carton must be positioned properly when taping to ensure the carton is square and the bottom is flat. The second problem arises when the corners of the inserts do not meet and prevent the test specimen from being square.

SUMMARY OF THE INVENTION

As described herein, and in accordance with one aspect of the invention, a container assembly comprises a container having a peripheral side wall defining a rectangular interior space and having top flap and bottom flaps folded inwardly to selectively enclose the interior space. The bottom flaps include notched edges for interlocking to maintain corners of the peripheral side wall square. An insert is removably receivable in the rectangular interior space. The insert comprises first and second panels of sheet material selectively folded to define a plurality of rectangular mold cavities in the interior space. Distal edges of the panels are notched wherein the notched edges interlock at the corners of the peripheral side wall to maintain the mold cavities square.

It is a feature that the bottom flaps comprise inner and outer flaps and the notched distal edges are in the outer flaps. The bottom inner flaps and outer flaps are connected to the peripheral side wall at fold lines. The fold lines of the outer flaps are offset from the fold lines of the inner flap to maintain the bottom flaps perpendicular with the peripheral side wall.

It is another feature that the top flaps comprise inner and outer flaps and the top inner flaps and outer flaps are connected to the peripheral side wall at fold lines. The fold lines for the outer flaps are offset from the fold lines for the inner flaps to maintain the top flaps perpendicular to the side wall.

It is a further feature that the container and each panel are formed of paper laminates.

It is an additional feature that each panel is of identical construction.

There is disclosed in accordance with another aspect a container assembly for forming a plurality of grout specimens comprising a container having a peripheral side wall defining a rectangular interior space and having top inner and outer flaps and bottom inner and outer flaps folded inwardly to selectively enclose the interior space. The bottom inner flaps and bottom outer flaps are connected to the peripheral side wall at fold lines where the fold lines for the bottom outer flaps are offset from the fold lines for the bottom inner flaps to maintain the bottom flaps perpendicular to the peripheral side wall. The top inner flaps and top outer flaps are connected to the peripheral side wall at fold lines wherein the fold lines for the top outer flaps are offset from the fold lines for the top inner flaps to maintain the top flaps perpendicular with the peripheral side wall. An insert is removably receivable in the rectangular space. The insert comprises sheet material selectively folded to define a plurality of rectangular mold cavities in the interior space.

There is disclosed in accordance with another aspect a container assembly for forming a plurality of grout specimens comprising a container having a peripheral side wall defining a rectangular interior space and having top flaps and bottom flaps folded inwardly to selectively enclose the interior space. An insert is removably receivable in the rectangular interior space. The insert comprises first and second panels of sheet material selectively folded to define a plurality of rectangular mold cavities in the interior space. Distal edges of the panels are notched. The notched edges of the panels interlock at corners of the peripheral side wall to maintain the cavities square.

More particularly, the container offsets the two opposite outer flap fold lines based on the thickness of the corrugated material from the adjacent inner flap fold lines. Thus, when assembled, the folds are staggered allowing the bottom to be flat. The two bottom outer flaps are notched so that they interlock and force the container to be square for taping. Moreover, the corners of the inserts are notched to lock the inserts to keep the inserts square.

Further features and advantages will be readily apparent from the specification and from the drawings.

BRIEF DESCRIPTION OF THE DRAWINGS

FIG. 1 is a bottom perspective view of a container assembly for forming grout specimens as described herein;

FIG. 2 is a plan view of the sheet material used for forming the container of the assembly of FIG. 1;

FIG. 3A is a partial bottom perspective view illustrating an offset used for bottom fold lines;

FIG. 3B is a partial top perspective view illustrating an offset used for top fold lines;

FIG. 4 is a perspective view of the container, similar to that of FIG. 1, without the insert;

FIG. 5 is a bottom perspective view of the container with flaps closed;

DETAILED DESCRIPTION

Figure 6:
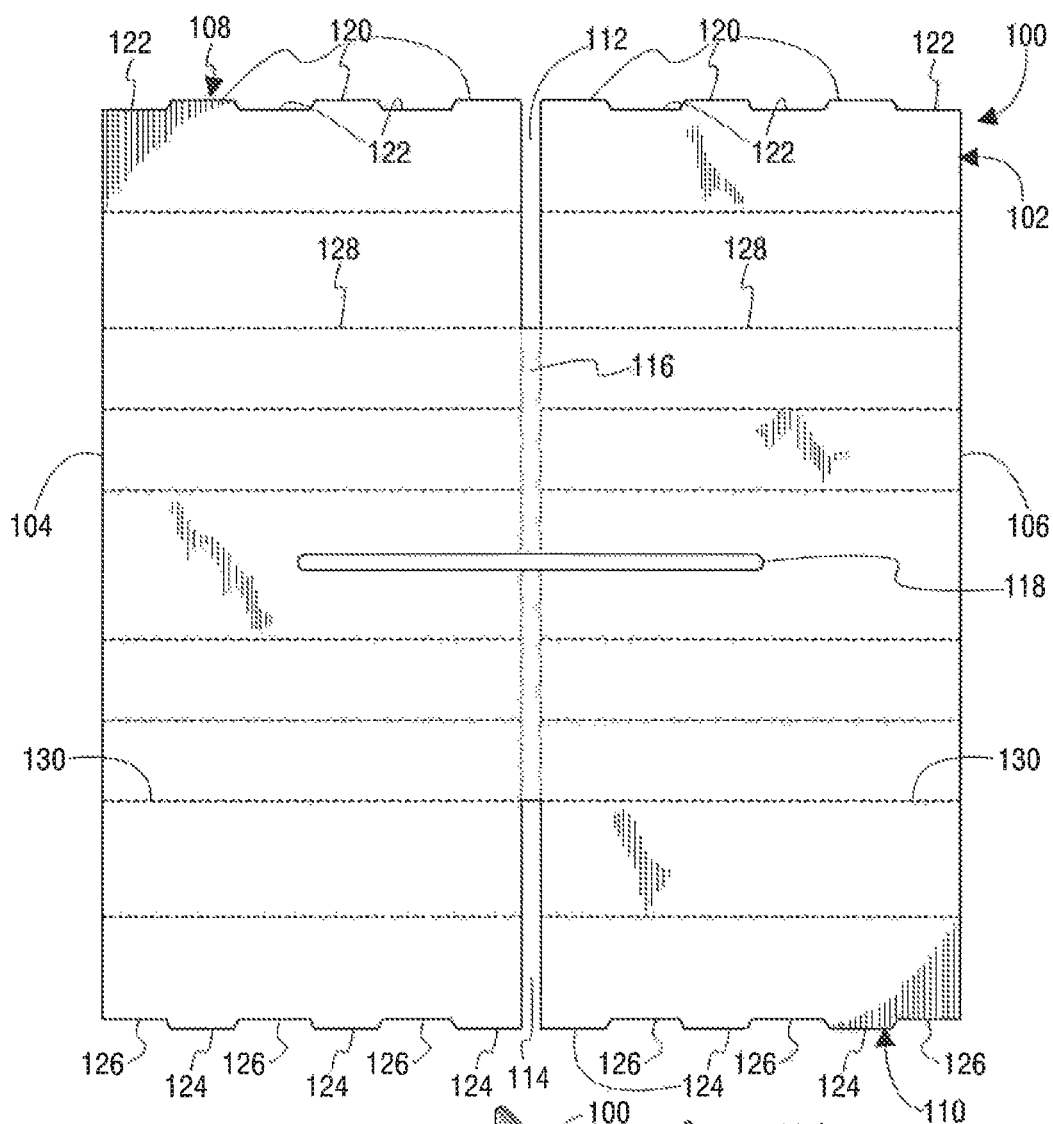
FIG. 6 is a plan view of the sheet material used for forming the insert.

Referring initially to FIG. 1, a container assembly 10 is used for preparing grout specimens for testing as described in ASTM C1019-16. The grout specimen is intended to be a square prism having a square cross section at least three inches on the sides, and twice as high as its width. The container assembly 10 can be used at a job site to collect grout samples to be transported to a facility for testing.

The container assembly 10 includes a container 12 and an insert 14. The container 12 is nominally 7" square and the insert 14 is sized to fit within the inner walls of the container 12. The insert 14 is configured to provide four rectangular mold cavities A, B, C and D. The mold cavities are nominally 3" square.

Referring to FIG. 2, the container 12 comprises a single sheet 16 of paper laminate, such as corrugated cardboard. In the illustration, the dashed lines indicate fold lines formed by perforation or depressions, or the like. The material used for the container 12 is approximately ⅛" thick and may be formed of 200 lb. paper.

The container 12 includes a peripheral side wall 18 defined by consecutive side panels 18-1, 18-2, 18-3 and 18-4 with a large flap 20 at the side wall panel 18-4. The sheet includes top flaps 22. The top flaps 22 comprise top inner flaps 24 and 26 and top outer flaps 28 and 30. The first top inner flap 24 is separated from the second panel 18-2 by a fold line 31. The second top inner flap 26 is separated from the fourth panel 18-4 by a fold line 33. The first top outer flap 28 is separated from the first panel 18-1 by a fold line 32. The second top outer flap 30 is separated from the third panel 18-3 by a fold line 34. The outer flap fold lines 32 and 34 are offset from the inner flap fold lines 31 and 33 by ⅛". Adjacent flaps are separated by slots, such as a slot 36 between the flaps 24 and 28, a slot 38 between the flaps 24 and 30 and a slot 40 between the flaps 30 and 26.

The sheet 16 includes bottom flaps 42 comprising bottom inner flaps 44 and 46 and bottom outer flaps 48 and 50. The first bottom inner flap 44 is separated from the second panel 18-2 by a fold line 52. The second bottom inner flap 46 is separated from the fourth panel 18-4 by a fold line 54. The first bottom outer flap 48 is separated from the first panel by a fold line 56. The second bottom outer flap 50 is separated from the third panel 18-3 by fold line 58. The outer flap fold lines 56 and 58 are offset from the inner flap fold lines 52 and 54 by ⅛", corresponding to thickness of the material. The bottom flaps 48 and 44 are separated by a slot 60. The bottom flaps 44 and 50 are separated by a slot 62. The flaps 50 and 46 are separated by a slot 64. The first bottom outer flap 48 includes trapezoidal notches 66 separated by trapezoidal projections 68. The second bottom outer flap 60 includes trapezoidal projections 70 separated by trapezoidal notches 72. The projections 68 and 70 are sized to be received in the notches 72 and 66, respectively.

Finally, a fold line 74 separates the side wall panels 18-1 and 18-2. A fold line 76 separates the panels 18-2 and 18-3, A fold line 78 separates the panels 18-3 and 18-4. A fold line 80 separates the panel 18-4 from the flap 20.

To assemble the container 12, the sheet 16 is folded at the fold lines 74, 76 and 78 to form a regular slotted container form with the flap 20 adhered, such as by adhesive, to the outside of the first panel 18-1. The top inner flaps 24 and 26 are folded in, followed by the top outer flaps 28 and 30. As is apparent, the top flaps 22 would be folded last but are described at this point consistent with the illustrations. Offsetting the top flap fold lines maintains the top flaps 22 perpendicular with the peripheral side wall 18 without bowing in order to provide a square box.

As assembled, the container 12 defines a rectangular interior space 82, as shown in FIG. 3. To fully enclose the space 82, the bottom inner flaps 44 and 46 are folded inwardly, followed by the bottom outer flaps 48 and 50. With the notched edges, the projections 70 are received in the notches 66 and the projections 68 are received in the notches 72 to maintain the bottom flaps in alignment prior to taping to maintain the container 12 square at the corners. Offsetting the bottom flap fold lines maintains the bottom flaps 42 perpendicular with the peripheral side wall 18 without bowing in order to provide a square box. Thus, owing to the combination of the offset fold lines for the flaps and the interlocking edges, the design ensures a square container that will produce specimens that have square ends and sides that are perpendicular to top and bottom ends.

Figure 7:
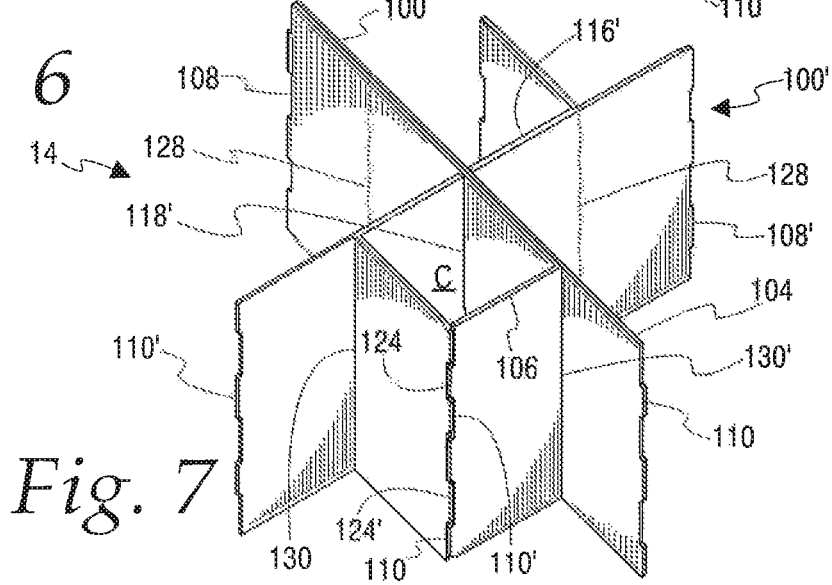
FIG. 7 is a perspective view illustrating the insert being prepared for installation in the container.

The insert 14, see FIG. 7, is formed using two panels 100 and 100' of identical construction. The panel 100 is illustrated in FIG. 6 before folding and comprises a sheet 102 of paper laminate, such as corrugated cardboard. The sheet 102 comprises 200 lb. paper and is about ⅛" thick. Dashed lines represent fold lines, as above.

The sheet 102 is generally rectangular and has opposite longitudinal straight edges 104 and 106. Opposite lateral edges 108 and 110 are notched. Slots 112 and 114 extend longitudinally inwardly from respective lateral edges 108 and 110 and are aligned with a fold line 116 extending therebetween. A central slot 118 extends laterally across the fold line 116 and is equidistant from the lateral edges 108 and 110.

The notched lateral edge 108 is formed by projections 120 and notches 122 alternating laterally from the slot 112 in both directions. Similarly, projections 124 and notches 126 alternate laterally outwardly from the slot 114 at the notched lateral edge 110. The notches are ⅛" in depth corresponding to thickness of the sheet material and are sized to receive the projections.

To create the insert 14, the first panel 100 is folded at the fold line 116 which then is positioned at the bottom as shown in FIG. 7. Similarly, the second panel 100' is folded along the fold line 116', which is in position at the top, as shown in FIG. 7. The panels 100 and 100' are interlocked by aligning the slot 118' and the slot 118 (not shown) and sliding them together to form a + sign.

The sheet material 102 includes a fold line 128 extending laterally between the longitudinal edges 104 and 106 at an inner end of the slot 112. The fold line 128 is equidistant between the central slot 118 and the lateral edge 108. Similarly, a fold line 130 extends laterally between the longitudinal edges 104 and 106 at an inner end of the slot 114. The fold line 130 is equidistant between the central slot 118 and the lateral edge 110.

The sheet material is then folded at the fold lines 128 and 130 and 128' and 130' as partially illustrated in FIG. 7, to form the mold cavities A, B, C and D. The notched edges 108, 108', 110 and 110', interlock at corners, as by the notches 122, 122', 126 and 126" receiving the projections 120, 120', 124 and 124', as is apparent, to maintain the mold cavities A, B, C and D square, see FIG. 1.

The insert 14 is then placed in the container 12, as shown in FIG. 1, to form the container assembly 10. Because of the interlocking of the inserts, the panels lock into each other and will not spread apart from each other as is possible without interlocking edges. Indeed, the interlocking internal panels ensure a tight fitting and truly square prism for grout sampling. The cavities A, B, C and D are then filled with grout and the container 12 closed.

Thus, as described, the container assembly 12 is adapted to produce specimens as required for testing. Other than the interlocking edges of the insert corners and bottom flaps, and offset for the flaps, as described herein, the container assembly may be formed as described in U.S. Pat. No. 5,942,192, incorporated by reference herein. Also, the container 12 and insert 14 could be formed of different materials from that described herein and having different dimensions.

The invention claimed is:

1. A container assembly for forming a plurality of grout specimens, comprising:
    a container having a peripheral sidewall defining a rectangular interior space and having top flaps and bottom flaps folded inwardly to selectively enclose the interior space, the bottom flaps comprising first and second bottom flaps and the first bottom flap includes a, distal edge having alternating notches and projections and the second bottom flap includes a distal edge, having alternating protections and notches so that the first bottom flap projections are received the second bottom flap: notches add the second bottom flap projections are received in the first bottom flap notches for interlocking to maintain corners of the peripheral sidewall square; and
    an insert removably receivable in the rectangular interior space, the insert comprising first and second panels of sheet material selectively folded to define a plurality of rectangular mold cavities in the interior space, distal edges of the panels being notched wherein the notched edges of the panels interlock to form corners that meet at the corners of the peripheral sidewall to maintain the mold cavities square.

2. The container assembly of claim 1 wherein the bottom flaps comprise inner and outer flaps and the first and second bottom flaps comprise the outer flaps.

3. The container assembly of claim 2 wherein the bottom inner flaps and outer flaps are connected to the peripheral sidewall at fold lines and wherein the fold lines for the outer flaps are offset from the fold lines for the inner flaps to maintain the bottom flaps perpendicular with the peripheral sidewall.

4. The container assembly of claim 1 wherein the top flaps comprise inner and outer flaps and the top inner flaps and outer flaps are connected to the peripheral sidewall at fold lines and wherein the fold lines for the outer flaps are offset from the fold lines for the inner flaps to maintain the top flaps perpendicular with the peripheral sidewall.

5. The container assembly of claim 1 wherein the container is formed of a single sheet of paper laminate.

6. The container assembly of claim 1 wherein each panel is of identical construction.

7. The container assembly of claim 1 wherein each panel is formed of paper laminate.

8. A container assembly for forming a plurality of grout specimens, comprising:
    a container having a peripheral sidewall defining a rectangular interior space and having top inner and outer flaps and bottom inner and outer flaps folded inwardly to selectively enclose the interior space, the bottom inner flaps and outer flaps are connected to the peripheral sidewall at fold lines and wherein the fold lines for the bottom outer flaps are offset from the fold lines for the bottom inner flaps to maintain the bottom flaps perpendicular with the peripheral sidewall, and the top inner flaps and outer flaps are connected to the peripheral sidewall at fold lines and wherein the fold lines for the top outer flaps are offset from the fold lines for the top inner flaps to maintain the top flaps perpendicular with the peripheral sidewall, wherein the bottom outer, flaps include notched distal edges for interlocking to maintain corners of the peripheral sidewall square; and
    an insert removably receivable in the rectangular interior space, the insert comprising first and second panels of sheet material selectively folded to define a plurality of rectangular mold cavities in the interior space, distal edges of the panels being notched wherein the notched edges of the panels interlock to form corners that meet at the corners of the peripheral sidewall to maintain the mold cavities square.

9. The container assembly of claim 8 wherein distal edges of the panels are notched wherein notched edges of the sheet material interlock at corners of the peripheral sidewall to maintain the cavities square.

10. The container assembly of claim 8 wherein the container is formed of a single sheet of paper laminate.

11. The container assembly of claim 8 wherein the sheet material comprises first and second panels of identical construction.

12. The container assembly of claim 11 wherein each panel is formed of paper laminate.

13. The container assembly of claim 11 wherein the panels are folded to provide walls to define four square mold cavities.

14. A container assembly for forming a plurality of grout specimens, comprising:
    a container having a peripheral sidewall defining a rectangular interior space and having top flaps and bottom flaps folded inwardly to selectively enclose the interior space; and
    an insert removably receivable in the rectangular interior space, the insert comprising first and second panels of sheet material selectively folded to define a plurality of rectangular mold cavities in the interior space, distal edges of the panels having alternating notches and projections where the projections are received in the notches to form corners that once inserted, meet at formed corners of the peripheral sidewall to maintain the cavities square.

15. The container assembly of claim 14 wherein the bottom flaps comprise inner and outer flaps and the outer flaps include distal edges for interlocking to maintain corners of the peripheral sidewall square.

16. The container assembly of claim 15 wherein the bottom inner flaps and outer flaps are connected to the peripheral sidewall at fold lines and wherein the fold lines for the outer flaps are offset from the fold lines for the inner flaps to maintain the bottom flaps perpendicular with the peripheral sidewall.

17. The container assembly of claim 14 wherein the top flaps comprise inner and outer flaps and the top inner flaps and outer flaps are connected to the peripheral sidewall at fold lines and wherein the fold lines for the outer flaps are offset from the fold lines for the inner flaps to maintain the top flaps perpendicular with the peripheral sidewall.

18. The container assembly of claim 14 wherein the container is formed of a single sheet of paper laminate.

19. The container assembly of claim 14 wherein each panel is formed of paper laminate.

* * * * *